United States Patent
Raju et al.

(10) Patent No.: US 8,813,074 B2
(45) Date of Patent: Aug. 19, 2014

(54) DETECTING AND CORRECTING NETWORK INTERRUPTIONS USING NETWORK ADDRESS TRANSLATION

(75) Inventors: Nithin Bangalore Raju, Sunnyvale, CA (US); Scott J. Goldman, Palo Alto, CA (US); Anupam Chanda, San Jose, CA (US); Bhavesh Purushottam Davda, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 395 days.

(21) Appl. No.: 13/204,301

(22) Filed: Aug. 5, 2011

(65) Prior Publication Data
US 2013/0036416 A1 Feb. 7, 2013

(51) Int. Cl.
*G06F 9/455* (2006.01)
*H04L 12/28* (2006.01)

(52) U.S. Cl.
USPC ............................................................ 718/1

(58) Field of Classification Search
CPC .............. G06F 9/45533; G06F 9/5077; G06F 17/30949; H04L 45/00
See application file for complete search history.

(56) References Cited

U.S. PATENT DOCUMENTS

| | | | | |
|---|---|---|---|---|
| 7,274,684 B2 * | 9/2007 | Young et al. | ................... | 370/352 |
| 7,515,549 B2 * | 4/2009 | Wing et al. | ................... | 370/252 |
| 8,291,119 B2 * | 10/2012 | Rao et al. | ....................... | 709/249 |
| 8,352,563 B2 * | 1/2013 | Chaturvedi et al. | ........... | 709/206 |
| 8,477,771 B2 * | 7/2013 | Biswas et al. | .................. | 370/389 |
| 2006/0274741 A1 * | 12/2006 | Wing et al. | ................... | 370/389 |
| 2007/0199062 A1 * | 8/2007 | Cho | ................................ | 726/12 |
| 2011/0317554 A1 * | 12/2011 | Greenberg et al. | ........... | 370/230 |

* cited by examiner

*Primary Examiner* — Van Nguyen

(57) ABSTRACT

Embodiments provide a network address translation (NAT) service for network devices. A network connection from at least one private network device to the NAT service is received and a network connection from at least one remote device to the NAT service is received. The private network device is positioned within a private network and the remote device is positioned within a public network. A network availability of the remote device is determined. If the remote device is unavailable or a network configuration setting associated with the remote device changes, the private network device is notified and a connection reset message is transmitted to the private network device.

24 Claims, 5 Drawing Sheets

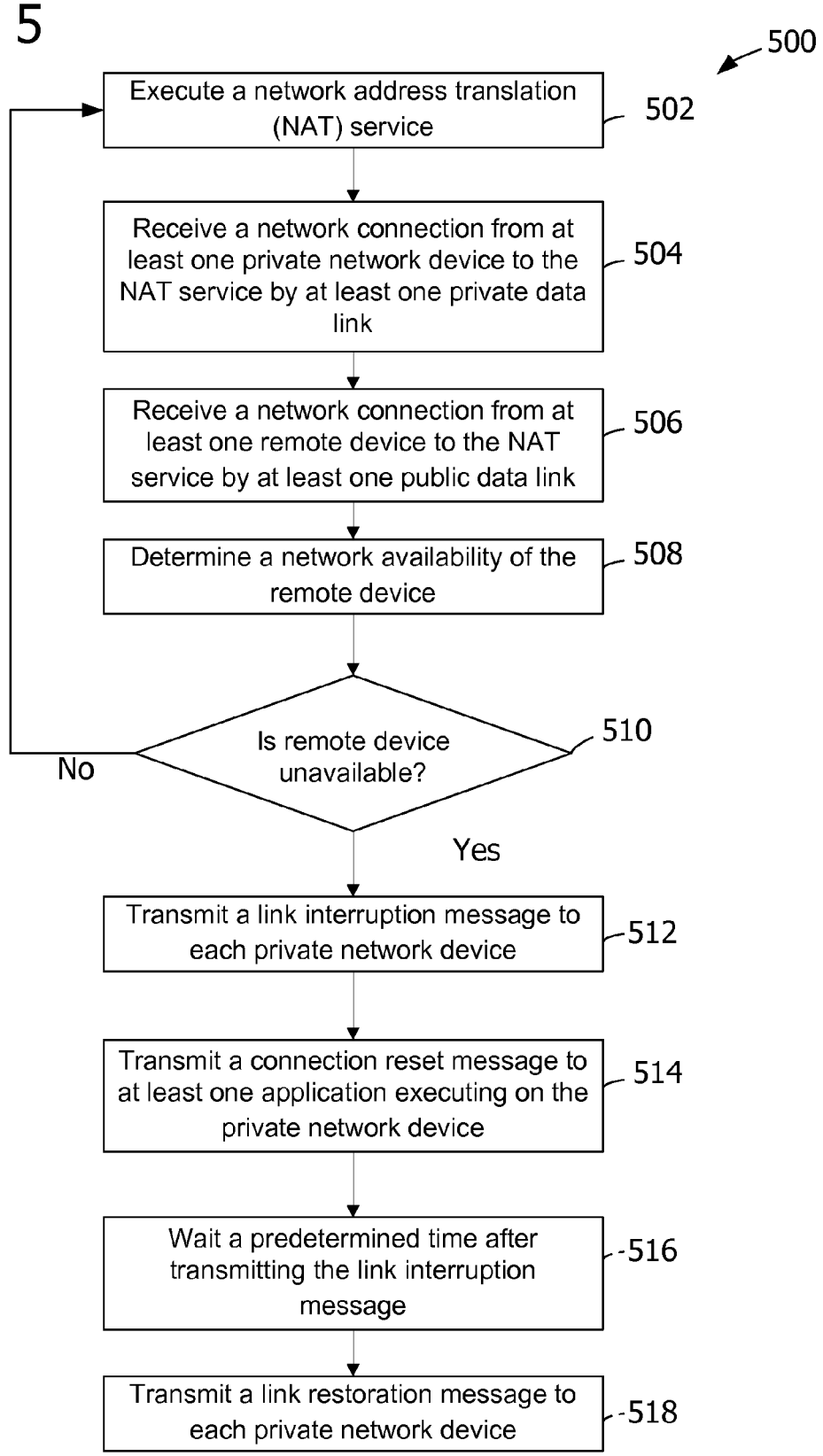

DETECTING AND CORRECTING NETWORK INTERRUPTIONS USING NETWORK ADDRESS TRANSLATION

BACKGROUND

Software applications, such as virtual machines (VMs), may be executed by a group, or "cluster," of host computing devices. Each VM creates an abstraction of physical computing resources, such as a processor and memory, of the host executing the VM and executes a "guest" operating system, which, in turn, executes one or more software applications. The abstracted resources may be functionally indistinguishable from the underlying physical resources to the guest operating system and software applications.

VMs or other devices may be connected together in one or more networks. A network address translation (NAT) device may be used with the VMs and the devices to hide each device's network address from being disclosed to external, or public, networks. Applications executing on the VMs may establish network connections to one or more remote devices within one or more public networks, such as the Internet. If a VM transmits a data packet to the remote device, the NAT device translates a private network address of the VM into a public network address. The public network address is used to connect to the remote device and to route data packets from the remote device back to the NAT device. When the NAT device receives the data packets from the remote device, the NAT device translates the public network address of the destination VM to the VM's private network address. The NAT device transmits the data packets to the VM using the private network address.

The network connectivity of the remote device, and the networks or uplinks connected to the remote device, may be dynamic in nature. For example, the network connectivity of the remote device or uplink may be temporarily or permanently interrupted. The network interruptions can cause some remote devices and/or uplinks to be unreachable by applications executing on devices or VMs within the private network. However, information regarding the network interruptions is not available to the applications and/or VMs within the private network, and the applications and/or VMs may continue to attempt to reach the currently unreachable parts or devices of the external network. This behavior can cause significant downtime for these applications and/or VMs and may degrade a user's experience. Often, the inaccessible remote device can be reached through another uplink or network connected to the NAT service, or another equivalent host or device on another reachable external network can provide the service or data the application on the private network requires. However, to receive the desired service or data from the other host or device, the application on the private network must sever its connection to the currently inaccessible remote device and initiate a new connection to the other host or device. Further, the network properties of various uplinks or networks (such as proxy settings) connected to the NAT service might be different from each other. A VM within the private network may have queried and cached the network settings of the default uplink (and thereby the default public network). If the default uplink (and thereby the default public network) for the NAT service changes, this information must be updated or the applications on the private network may no longer be able to reach the external network.

SUMMARY

One or more embodiments described herein provide a network address translation (NAT) service for use with physical and/or virtual network devices. The NAT service receives network connections from network devices positioned within a private network. The private network devices may be physical computing devices and/or virtual machines (VMs) executing on one or more host computing devices. The NAT service also receives network connections from remote devices positioned within one or more public networks. The NAT service determines a network availability of the remote devices, for example, by monitoring a status of a public port that each remote device is coupled to. If a remote device is unavailable, the NAT service notifies the private network devices of the unavailable status of the remote device. In addition, the NAT service transmits a connection reset message to at least one application executing on a private network device. After a predetermined time has elapsed, the NAT service notifies or directs the private network devices to re-establish network connections to remote devices.

This summary introduces a selection of concepts that are described in more detail below. This summary is not intended to identify essential features, nor to limit in any way the scope of the claimed subject matter.

BRIEF DESCRIPTION OF THE DRAWINGS

FIG. 5 is a flowchart of an exemplary method for translating network addresses between devices within a private network and devices within a public network.

DETAILED DESCRIPTION

Figure 1:
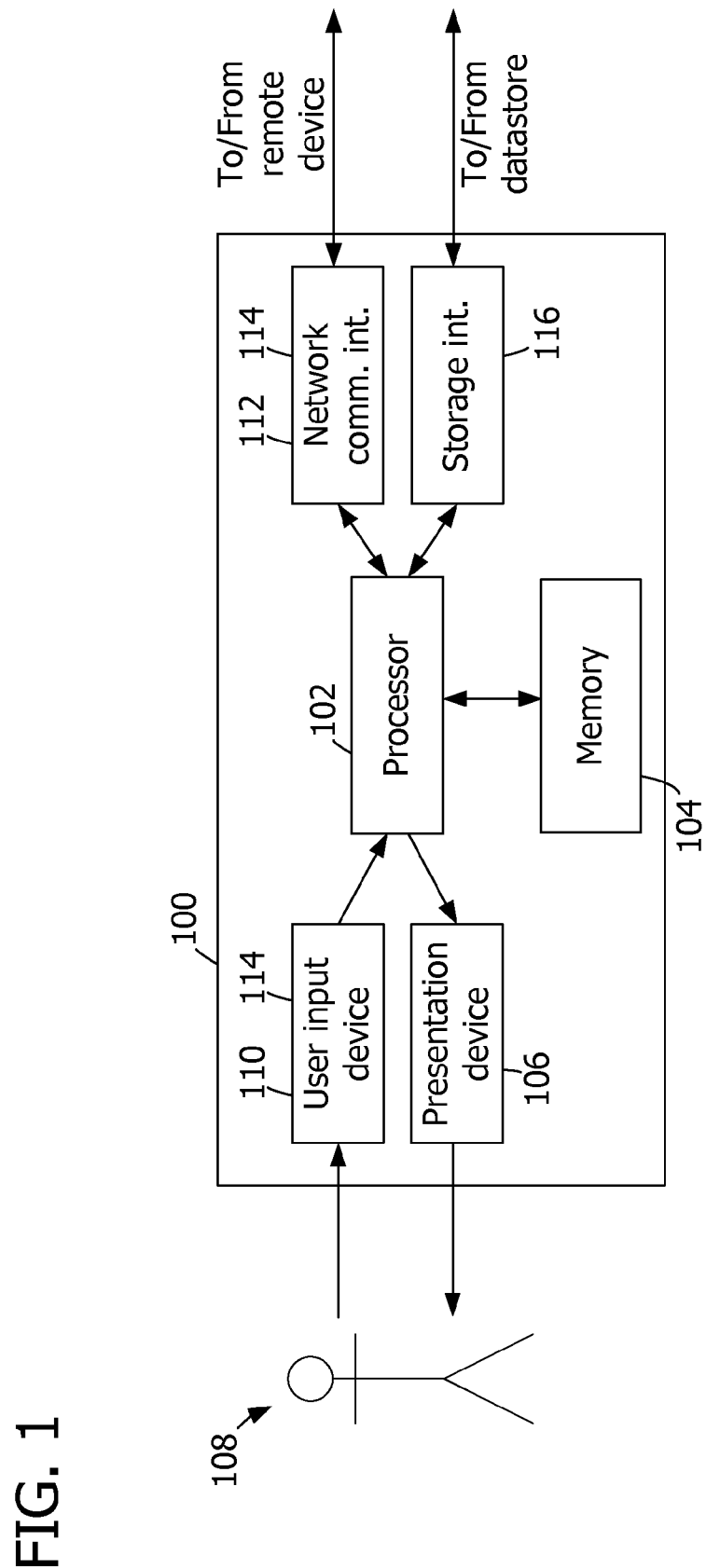
FIG. 1 is a block diagram of an exemplary computing device.

Embodiments described herein provide a network address translation (NAT) service that translates private network addresses of a computing device or a virtual machine (VM) into a public network address. The public network address is used to connect to remote devices within one or more public networks. In one embodiment, the NAT service is embodied within a routing device that is coupled to a plurality of computing devices within a private network, and to a plurality of remote devices within a public network. The NAT service determines a network availability of a remote device, for example, by monitoring a status of a public port that each remote device is coupled to. If the NAT service determines that the remote device is unavailable, the NAT service notifies the computing devices within the private network accordingly, for example, by removing the power to one or more ports that connect the computing devices to the routing device. The NAT service also transmits a connection reset message to each computing device that has an open network connection to the unavailable remote device. The NAT service waits for a predetermined amount of time, and then restores power to the ports connecting the computing devices to the routing device. Each computing device re-establishes network connections to available remote devices, thus circumventing the unavailable remote device.

In another embodiment, the NAT service is embodied within a routing application executing within a computing device. The routing application is connected to a plurality of VMs within a private network that are executed or instantiated on a computing device. The routing application is also connected to a plurality of remote devices within a public network. The NAT service determines a network availability of a remote device. If the NAT service determines that the remote device is unavailable, the NAT service notifies the VMs within the private network accordingly, for example, by transmitting a link interruption message to each VM. The NAT service also transmits a connection reset message to each VM that has an open network connection to the unavailable remote device. The NAT service waits for a predetermined amount of time, and then transmits a link restoration message to each VM within private network. Each VM re-establishes network connections to available remote devices, thus circumventing the unavailable remote device.

Accordingly, the NAT service described herein enables private network devices to recover from network interruptions in a communication path between the private network devices and one or more remote devices. Because the NAT service monitors and/or determines the network availability of the remote devices, the NAT service is enabled to quickly detect when a remote device becomes inaccessible. The NAT service terminates any open connections to the remote device and facilitates connecting the private network devices to a different remote device. Accordingly, the NAT service enables the private network devices to access network resources through an alternative path, thus improving the network access of the private network devices. In addition, if the configuration settings of the remote device and/or the public network change, or if the default uplink of the NAT service changes, the NAT service notifies the private network devices so that the devices may obtain the updated configuration settings and/or the updated default uplink. Accordingly, the NAT service enables the private network devices to continue to access data and/or services within one or more remote devices when the remote devices would otherwise be unreachable.

FIG. 1 is a block diagram of an exemplary computing device 100. Computing device 100 includes a processor 102 for executing instructions. In some embodiments, computer-executable instructions are stored in a memory 104 for performing one or more of the operations described herein. Memory 104 is any device allowing information, such as executable instructions, configuration options (e.g., threshold values), and/or other data, to be stored and retrieved. For example, memory 104 may include one or more computer-readable storage media, such as one or more random access memory (RAM) modules, flash memory modules, hard disks, solid state disks, and/or optical disks.

Computing device 100 also includes at least one presentation device 106 for presenting information to a user 108. Presentation device 106 is any component capable of conveying information to user 108. Presentation device 106 may include, without limitation, a display device (e.g., a liquid crystal display (LCD), organic light emitting diode (OLED) display, or "electronic ink" display) and/or an audio output device (e.g., a speaker or headphones). In some embodiments, presentation device 106 includes an output adapter, such as a video adapter and/or an audio adapter. An output adapter is operatively coupled to processor 102 and configured to be operatively coupled to an output device, such as a display device or an audio output device.

The computing device 100 may include a user input device 110 for receiving input from user 108. User input device 110 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of presentation device 106 and user input device 110.

Computing device 100 also includes a network communication interface 112, which enables computing device 100 to communicate with a remote device (e.g., another computing device 100) via a communication medium, such as a wired or wireless packet network. For example, computing device 100 may transmit and/or receive data via network communication interface 112. User input device 110 and/or network communication interface 112 may be referred to as an input interface 114 and may be configured to receive information, such as configuration options (e.g., threshold values), from a user.

Computing device 100 further includes a storage interface 116 that enables computing device 100 to communicate with one or more datastores. In exemplary embodiments, storage interface 116 couples computing device 100 to a storage area network (SAN) (e.g., a Fibre Channel network) and/or to a network-attached storage (NAS) system (e.g., via a packet network). The storage interface 116 may be integrated with network communication interface 112.

Figure 2:
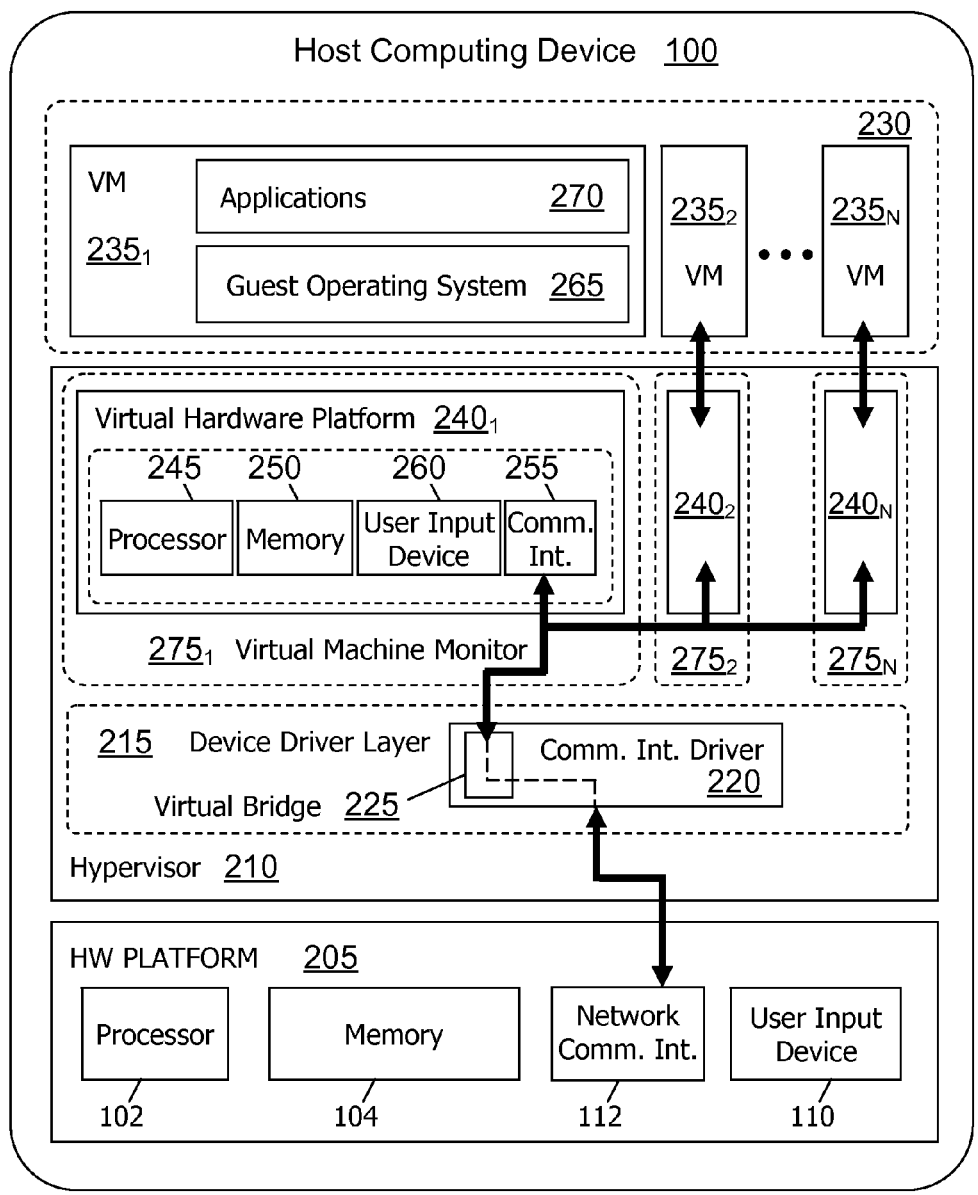
FIG. 2 is a block diagram of virtual machines that are instantiated on a computing device, such as the computing device shown in FIG. 1.

FIG. 2 depicts a block diagram of virtual machines $235_1$, $235_2 \ldots 235_N$ that are instantiated on a computing device 100, which may be referred to as a "host." Computing device 100 includes a hardware platform 205, such as an x86 architecture platform. Hardware platform 205 may include processor 102, memory 104, network communication interface 112, user input device 110, and other input/output (I/O) devices, such as a presentation device 106 (shown in FIG. 1). A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. Hypervisor 210 includes a device driver layer 215, and maps physical resources of hardware platform 205 (e.g., processor 102, memory 104, network communication interface 112, and/or user input device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$). Each virtual hardware platform includes its own emulated hardware (such as a processor 245, a memory 250, a network communication interface 255, a user input device 260 and other emulated I/O devices in VM $235_1$).

In some embodiments, memory 250 in first virtual hardware platform $240_1$ includes a virtual disk that is associated with or "mapped to" one or more virtual disk images stored in memory 104 (e.g., a hard disk or solid state disk) of computing device 100. The virtual disk image represents a file system (e.g., a hierarchy of directories and files) used by first virtual machine $235_1$ in a single file or in a plurality of files, each of which includes a portion of the file system. In addition, or alternatively, virtual disk images may be stored in memory 104 of one or more remote computing devices 100, such as in a storage area network (SAN) configuration. In such embodiments, any quantity of virtual disk images may be stored by the remote computing devices 100.

Device driver layer 215 includes, for example, a communication interface driver 220 that interacts with network communication interface 112 to receive and transmit data from, for example, a local area network (LAN) connected to computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface for each VM $235_1$-$235_N$, such as network communication interface 255 for first VM $235_1$, may include an emulated network interface card (NIC) that includes at least one emulated network "jack" or connector for transmitting and receiving data within a virtual network. In an embodiment, software emulating the virtual NIC and/or the virtual connector is controlled by communication interface driver 220. Each virtual communication interface may be assigned a unique virtual Media Access Control (MAC) address that enables virtual bridge 225 to simulate the forwarding of incoming data packets from network communication interface 112. In an embodiment, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach the VM in computing device 100 with a virtual communication interface that corresponds to such virtual MAC address.

Virtual hardware platform $240_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM $235_1$. Virtual hardware platforms $240_1$-$240_N$ may be considered to be part of virtual machine monitors (VMM) $275_1$-$275_N$ which implement virtual system support to coordinate operations between hypervisor 210 and corresponding VMs $235_1$-$235_N$. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms $240_1$-$240_N$ may also be considered to be separate from VMMs $275_1$-$275_N$, and VMMs $275_1$-$275_N$ may be considered to be separate from hypervisor 210. Examples of hypervisor 210 that may be used in an embodiment of the disclosure are included as a component in VMware's Workstation or Fusion brand software, which is commercially available from VMware, Inc.

Figure 3:
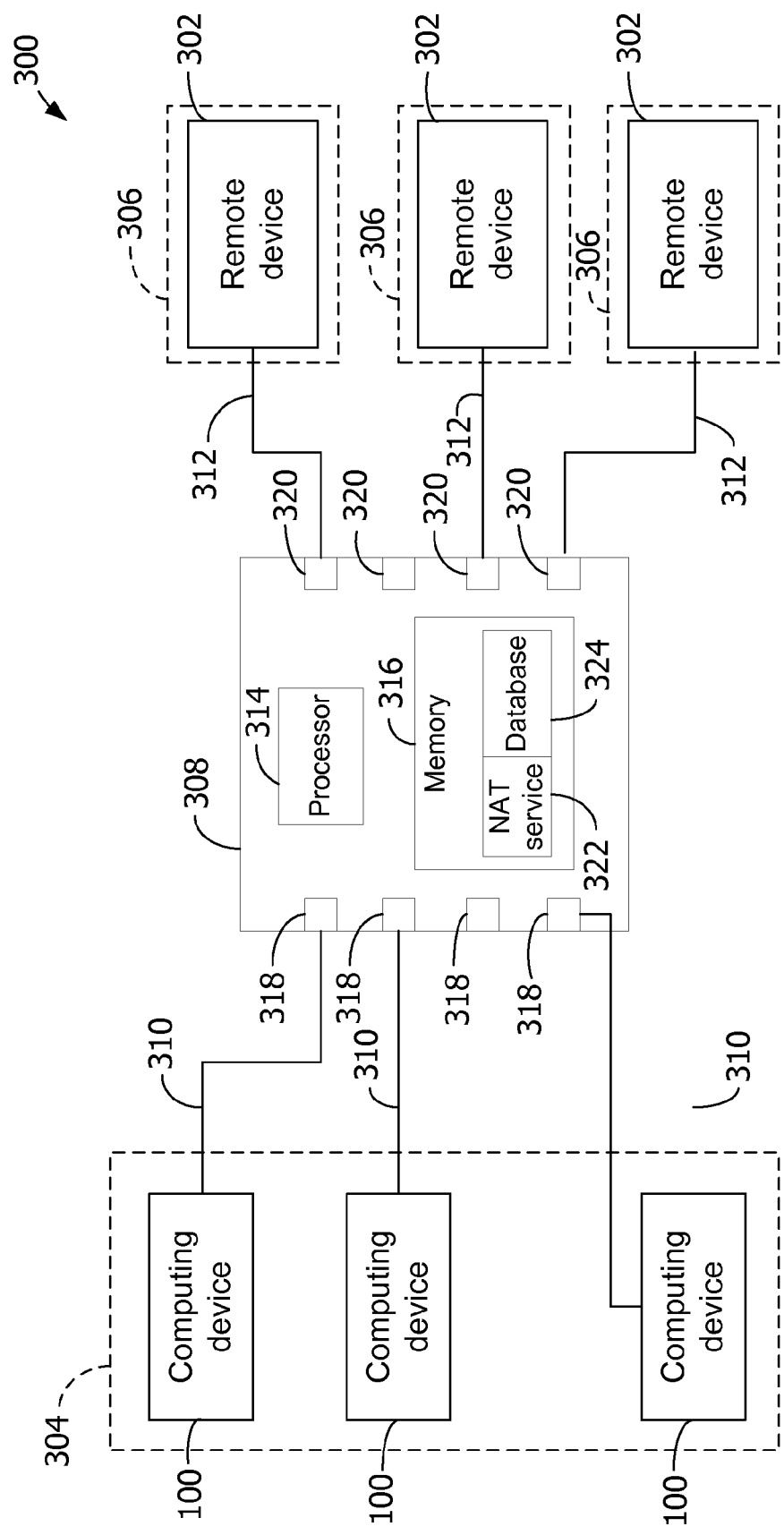
FIG. 3 is a block diagram of an exemplary network system including computing devices and remote devices.

FIG. 3 is a block diagram of an exemplary network system 300 of computing devices 100 and remote devices 302. Computing devices 100 form, or are included within, a private network 304, and remote devices 302 form, or are included within, one or more public networks 306. While FIG. 3 illustrates one private network 304, three computing devices 100, three remote devices 302, and three public networks 306, it should be understood that any number of private networks 304, computing devices 100, remote devices 302, and public networks 306 may be included to enable network system 300 to function as described herein. Network system 300 also includes at least one routing device 308 that transmits, or forwards, data packets between computing devices 100 and remote devices 302.

Private network 304 is a network in which the network address, including a MAC address, an Internet Protocol (IP) address, and/or a port number, of computing devices 100 within private network 304 are hidden from devices outside of private network 304. In contrast, public networks 306 are networks in which the network address, including a MAC address, an Internet Protocol (IP) address, and/or a port number, are exposed or are available to devices outside of public networks 306, such as computing devices 100.

Each computing device 100 within private network 304 is coupled to, and communicates with, routing device 308 using a respective private link 310. Private links 310 may be a wired data connection, such as a wired Ethernet cable, a wireless data connection, such as a wireless Ethernet connection, and/or any other connection that enables computing devices 100 to communicate with routing device 308. Further, each computing device 100 is coupled to a private link 310 by a respective network communication interface 112.

In an embodiment, remote devices 302 are servers or other computers that receive network connections and data packets from computing devices 100. In one embodiment, one or more remote devices 302 are computing devices 100. Each remote device 302 within each public network 306 is coupled to, and communicates with, routing device 308 using a respective public link 312, or "uplink." Public links 312 may be a wired data connection, such as a wired Ethernet cable, a wireless data connection, such as a wireless Ethernet connection, and/or any other connection that enables remote devices 302 to communicate with routing device 308.

Routing device 308 may be a router, a network switch, or any other device that routes data packets from computing devices 100 to remote devices 302, and from remote devices 302 to computing devices 100. In an embodiment, routing device 308 includes a processor 314 and a memory 316 coupled to processor 314.

Processor 314 includes any suitable programmable circuit including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor."

Memory 316 includes a computer-readable medium, such as, without limitation, random access memory (RAM), flash memory, a hard disk drive, a solid state drive, a diskette, a flash drive, a compact disc, a digital video disc, and/or any suitable memory. In an embodiment, memory 316 includes data and/or instructions that are executable by processor 314 (i.e., processor 314 is programmed by the instructions) to enable processor 314 to perform the functions described herein.

Routing device 308 also includes a plurality of private ports 318 and a plurality of public ports 320. While four private ports 318 and four public ports 320 are illustrated in FIG. 3, routing device 308 may include any suitable number of private ports 318 or public ports 320. Private ports 318 provide a connection point to private links 318 such that computing devices 100 in private network 304 are coupled to private ports 318 through private links 310. Public ports 320 provide a connection point to public links 312 such that remote devices 302 in public networks 306 are coupled to public ports 320 through public links 312.

Further, routing device 308 includes a network address translation (NAT) service 322. In an embodiment, NAT service 322 is stored within memory 316 as a plurality of computer-executable instructions and associated data. NAT service 322 is executed by processor 314, for example, when processor 314 is programmed with the instructions from memory 316. Further, NAT service 322 is communicatively coupled to private ports 318 and to public ports 320.

As described more fully herein, NAT service 322 enables routing device 308 to transmit data packets from private network 304 to public network 306 (i.e., from a computing device 100 to a remote device 302) while masking or hiding a private network address of a transmitting computing device 100. In addition, NAT service 322 enables routing device 308 to transmit data packets from public network 306 to private network 304 (i.e., from a remote device 302 to a computing device 100) while preventing devices within public network 306 from obtaining the private network address of the destination computing device 100.

NAT service 322 establishes and maintains a NAT database 324 or another data structure within memory 316 that stores network connection information for private network 304 and public networks 306. More specifically, database 324 stores a list of open network connections between one or more computing devices 100 within private network 304 and one or more public networks 306 and/or remote devices 302. Database 324 also stores a list of public ports 320 that are being used by the open network connections (i.e., each public port 320 that is being used to connect an application executing on computing device 100 within private network 304 to a remote device 302 within public network 306), and a network connectivity status of each public port 320 that has an open network connection associated therewith. Additionally or alternatively, database 324 stores a network availability or status of each public network 306 and/or remote device 302 that has an open network connection from a computing device 100. In an embodiment, database 324 also stores network configuration information or settings for each public port 320, public network 306, and/or remote device 302, such as an IP address that is required to connect to each public network 306 and/or remote device 302. Database 324 also stores a default remote device 302 and/or default public network 306 (and a default public port 320 required to connect to the default remote device 302 and/or the default public network 306) for each computing device 100 to connect to. In an embodiment, the default public port 320 provides a default connection to the default public network 306 and to the remote device 302 connected to the default public network 306. In other words, default public port 320 is a port that, by default, is used to establish a network connection to the remote device 302. In one embodiment, NAT service 322 determines the default remote device 302 and/or default public network 306 using a heuristic algorithm, and stores the default remote device 302 and/or public network 306 in database 324.

Further, database 324 stores network information for computing devices 100 of private network 304. The network information includes a private network address and a public network address for each computing device 100 that is connected to routing device 308. The private network address includes a MAC address, an IP address, and/or a port number that are hidden from remote devices 302. The public network address includes a MAC address, an IP address, and/or a port number that are provided to remote devices 302. Alternatively or additionally, the private network address and the public network address may include any other information that enables NAT service 322 to function as described herein.

In an embodiment, computing devices 100 on private network 304 may query network configuration settings of the default public network 306, such as proxy settings, from NAT service 322. The network configuration settings received from NAT service 322 may be stored within each computing device 100. The settings are retained and used for establishing network connections until the network configuration settings of network communication interface 112 are released or reset.

During operation, a computing device 100 within private network 304 may have an application executing therein that is configured to transmit data to a remote device 302 within a public network 306. The application opens one or more network connections to remote device 302 through network communication interface 112. Such network connections may include, but are not limited to only including, a transmission control protocol (TCP) connection, a user datagram protocol (UDP) connection, and/or any other suitable network connection. The application transmits one or more data packets (hereinafter referred to as "private outbound packets") to remote device 302. The private outbound packets include a header that identifies the network address of the remote device 302 and the private network address of the computing device 100. Routing device receives the private outbound packets through private link 310 and transmits the packets to NAT service 322. NAT service 322 references database 324 to correlate the private network address to the public network address, and replaces the private network address in each packet header with the public network address of computing device 100 to form one or more public outbound packets. Routing device 308 transmits the public outbound packets to remote device 302 through public port 320, public link 312, and public network 306.

Remote device 302 receives the public outbound packets and may transmit one or more data packets (hereinafter referred to as "public inbound packets") to computing device 100. As remote device 302 is only provided with the public network address of computing device 100, the public inbound packets include the public network address in the header of each packet. Routing device 308 receives the public inbound packets and transmits the packets to NAT service 322. NAT service 322 references database 324 to correlate the public network address with the private network address, and replaces the public network address in each packet header with the private network address of computing device 100 to form one or more private inbound packets. Routing device 308 transmits the private inbound packets to the destination computing device 100 through private link 310.

In certain situations, a network component, such as public link 312, public network 306, public port 320, and/or remote device 302, may become inaccessible such that communication between computing device 100 and remote device 302 is interrupted. In such a situation, NAT service 322 determines that the network connectivity with remote device 302 is unavailable or "down." In an embodiment, NAT service 322 determines the network connectivity or availability of the network components, such as remote device 302, by monitoring the network connectivity or status of the public port 320 that the network component is connected to. For example, if public port 320 is unavailable to communicate with remote device 302 (i.e., if public port 320 indicates that public link 312 or public network 306 connected to public port 320 is unavailable for network communication with remote device 302), NAT service 322 determines that the associated remote device 302 is also unavailable or down. In addition, NAT service 322 may detect that a network configuration setting of public port 320 has changed that renders remote device 302 unreachable or unavailable, such as a change of the network address or proxy settings of public port 320 used to connect to remote device 302. A change to the default public port 320 (i.e., a change to the default connection to the default public network 306) listed in database 324, and/or any other network configuration change may also indicate that remote device 302 or public network 306 is unreachable or unavailable. Alternatively, NAT service 322 may receive a message or signal from remote device 302, public network 306, public link 312, and/or public port 320 indicating that remote device 302 is unavailable.

If NAT service 322 determines that remote device 302 is unavailable (i.e., that public port 320 is unavailable to communicate with remote device 302), that the default public network 306 has changed, and/or that the network configuration setting of public port 320 has changed, NAT service 322 updates database 324 to indicate the network availability of remote device 302, the network availability status of public port 320, and/or the network configuration settings of public port 320 associated with remote device 302. NAT service 322 also updates the default public network 306 in database 324. Further, NAT service 322 notifies each computing device 100 within private network 304 that remote device 302 or public network 306 is unavailable and/or that a network configuration setting associated with remote device 302 or public network 306 has changed, and/or that the default public network 306 (or the associated default port 320) has changed. In an embodiment, the notification includes removing power from each private port 318. When power is removed from each private port 318, each network adapter (i.e., network communication interface 112) of each computing device 100 detects that power has been removed from private ports 318 and that private links 310 are unusable. Each network communication interface 112 releases or resets its network configuration settings to uninitialized values such that computing devices 100 do not communicate with routing device 308 through private links 310. In one embodiment, NAT service 322 notifies each computing device 100 that public network 306 is unavailable (e.g., by removing power from private ports 318), regardless of whether computing devices 100 have any open network connections to the unavailable remote device 302 or to any other remote devices 302.

NAT service 322 waits a predetermined amount of time, and then notifies each computing device 100 within private network 304 that network connections may be reinitialized, e.g., by restoring power to private ports 318. The predetermined amount of time may be about 5 seconds, or may be any other amount of time that enables NAT service 322 to function as described herein. When network communication interfaces 112 detect that power has been restored to private ports 318, computing devices 100, i.e., network communication interfaces 112, reinitialize or reconfigure their network configuration settings, including IP address and proxy settings. The reinitialization or reconfiguration of the network settings may include, for example, flushing a domain name system (DNS) cache within computing devices 100. In addition, computing devices 100 and/or network communication interfaces 112 reconfigure network connections to routing device 308 and to one or more remote devices 302. Further, computing devices 100 query remote devices 302, through NAT service 322, to determine the network configuration settings (e.g., the IP address) of remote devices 302 or proxy settings for public network 306. The configuration settings may be used to establish future network connections. Additionally, computing devices 100 may query NAT service 322 to determine the default remote device 302 and/or public network 306 to connect to. Alternatively, NAT service 322 may use any suitable notification or message that enables NAT service 322 to direct computing devices 100 to reinitialize the network connection to routing device 308 and remote device 302.

Certain applications executing on computing devices 100 may have open network connections, e.g., at a protocol layer, to remote device 302 even after private links 310 and/or private ports 318 have been reset and network communication interfaces 112 have been reinitialized. Accordingly, in response to the determination that a remote device 302 associated with an open network connection listed in database 324 is unavailable (i.e., that public port 320 is unavailable to communicate with remote device 302) and/or that a network configuration setting of public port 320 has changed, NAT service 322 transmits a message (hereinafter referred to as a "connection reset message") at a protocol layer directing each application executing on each computing device 100 and having an open network connection with remote device 302 to reset the network connection. Specifically, NAT service 322 references database 324 to identify each open network connection to the unavailable remote device 302. NAT service 322 transmits the connection reset message to each computing device 100 associated with the identified open network connections (and thereby to each application executing on computing devices 100). In an embodiment, the connection reset message is a TCP reset message or packet (i.e., a TCP-based packet with a reset flag or bit set) that causes the applications executing on computing devices 100 to reset their network connections to remote device 302. Alternatively, the connection reset message may be any suitable message or packet that enables NAT service 322 to direct the applications to reset their network connections to remote device 302.

After resetting the network connections of the applications, each application reinitializes and/or reconfigures the network connections to remote device 302. Such a reconfiguration of the network connections to remote device 302 may result in computing devices 100 connecting to remote device 302 through a different network path or public port 320 to avoid a faulty public link 312 and/or a faulty public network 306. If remote device 302 remains unavailable, the applications (and computing devices 100) negotiate network connections to another remote device 302. Accordingly, the applications executing on computing devices 100 may circumvent the unavailable remote device 302 and negotiate an alternative path or resource for obtaining desired data.

Figure 4:
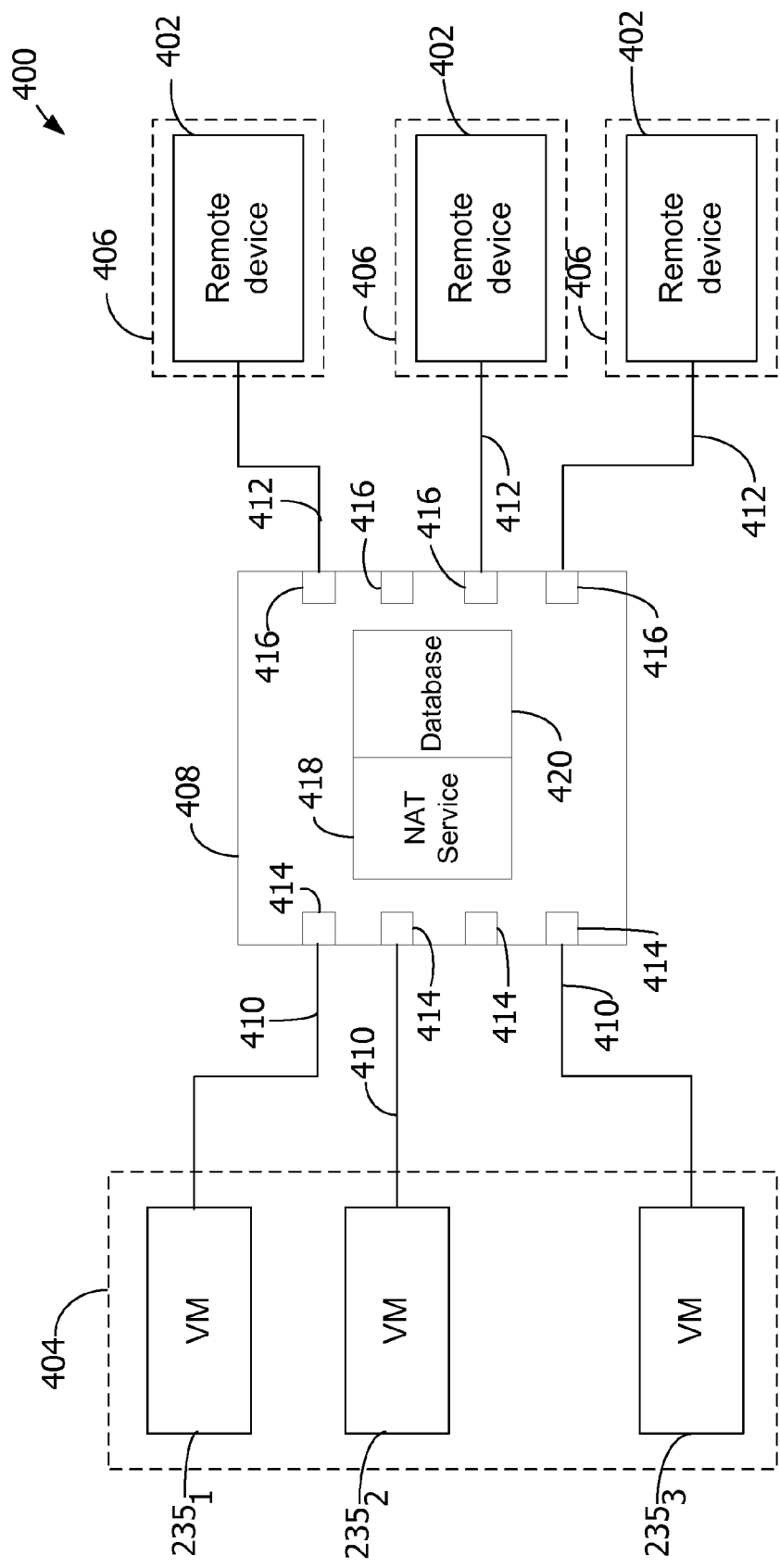
FIG. 4 is a block diagram of an exemplary virtual network system including virtual machines and remote devices.

FIG. 4 is a block diagram of an exemplary virtual network system 400 of virtual machines (VMs) $235_1$-$235_N$ and remote devices 402. VMs $235_1$-$235_N$ form, or are included within, a private network 404, and remote devices 402 form, or are included within, one or more public networks 406. While FIG. 4 illustrates one private network 404, three VMs $235_1$-$235_3$, three remote devices 402, and three public networks 406, it should be understood that any number of private networks 404, VMs $235_1$-$235_N$, remote devices 402, and public networks 406 may be included to enable network system 400 to function as described herein. Network system 400 also includes at least one virtual routing device 408, or routing application 408, that transmits, or forwards, data packets between VMs $235_1$-$235_N$ and remote devices 402.

Private network 404 is a virtual network including a plurality of VMs $235_1$-$235_N$ instantiated within one or more hosts, such as one or more computing devices 100. VMs $235_1$-$235_N$ within private network 404 include network addresses, such as a MAC address, an IP address, and/or a port number, that are hidden from devices or applications outside of private network 404. In contrast, public networks 406 are networks of devices, such as one or more remote devices 402, in which network addresses of the devices, including a MAC address, an IP address, and/or a port number, are exposed or available to other devices outside of public networks 406.

Each VM $235_1$-$235_N$ within private network 404 is coupled to, and communicates with, routing application 408 using a respective virtual private link 410. Private links 410 may represent a virtual wired data connection or a virtual wireless data connection with routing application 408. Further, VMs $235_1$-$235_N$ are communicatively coupled to private links 410 by a respective communication interface 255. In one embodiment, private network 404 and/or private links 410 are embodied within a software switch that transmits messages between routing application 408 and identified VMs $235_1$-$235_N$.

Remote devices 402 are servers or other computers that are communicatively coupled to routing application 408. In one embodiment, one or more remote devices 402 are VMs $235_1$-$235_N$ instantiated within one or more hosts, such as one or more computing devices 100. In such an embodiment, one or more remote devices 402 may be instantiated within the same host or computing device 100 as one or more VMs $235_1$-$235_N$ of private network 404. Each remote device 402 within each public network 406 is coupled to, and communicates with, routing application 408 using a respective public link 412, or uplink. Public links 412 may be a wired data connection, such as a wired Ethernet cable, a wireless data connection, such as a wireless Ethernet connection, and/or any other connection that enables remote devices 402 to communicate with routing application 408.

Routing application 408 may be a virtual router, a virtual network switch, or any other virtual device or application that routes data packets from VMs $235_1$-$235_N$ to remote devices 402 and from remote devices 402 to VMs $235_1$-$235_N$. Routing application 408 may include a plurality of private ports 414 and a plurality of public ports 416. While four private ports 414 and four public ports 416 are illustrated in FIG. 4, routing application 408 may include any suitable number of private ports 414 or public ports 416. VMs $235_1$-$235_N$ in private network 404 are coupled to private ports 414 through private links 410, and remote devices 402 in public networks 406 are coupled to public ports 416 through public links 412.

Further, routing application 408 includes a network address translation (NAT) service 418. In an embodiment, NAT service 418 is an application stored within a memory of a computing device 100 and/or a VM $235_1$-$235_N$ as a plurality of computer-executable instructions and associated data. Routing application 408 and NAT service 418 are executed by a processor of computing device 100 and/or VM $235_1$-$235_N$, for example, when the processor is programmed with the instructions from the memory. Further, NAT service 418 is communicatively coupled to private ports 414 and to public ports 416.

NAT service 418 enables routing application 408 to transmit data packets from private network 404 to public network 406 (i.e., from a VM $235_1$-$235_N$ to a remote device 402) while masking or hiding a private network address of a transmitting VM $235_1$. In addition, NAT service 418 enables routing application 408 to transmit data packets from public network 406 to private network 404 (i.e., from a remote device 402 to a VM $235_1$-$235_N$) while preventing devices within public network 406 from obtaining the private network address of the destination VM $235_1$.

NAT service 418 establishes and maintains a NAT database 420 or another data structure within the memory of computing device 100 and/or a VM $235_1$-$235_N$ that stores network connection information for private network 404 and public networks 406. More specifically, database 420 stores a list of open network connections between one or more VMs $235_1$-$235_N$ within private network 404 and one or more public networks 406 and/or remote devices 402. Database 420 also stores a list of public ports 416 that are being used by the open network connections (i.e., each public port 416 that is being used to connect an application executing on VM $235_1$-$235_N$ within private network 404 to a remote device 402 within public network 406), and a network connectivity or status of each public port 416 that has an open network connection associated therewith. Additionally or alternatively, database 420 stores a network availability or status of each public network 406 and/or remote device 402 that has an open network connection from a VM $235_1$-$235_N$. In an embodiment, database 420 also stores network configuration information or settings for each public port 416, public network 406, and/or remote device 402, such as an IP address that is required to connect to each public network 406 and/or remote device 402. Database 420 also stores a default remote device 402 and/or default public network 406 (and a default public port 416 required to connect to the default remote device 402 and/or default public network 406) for each VM $235_1$-$235_N$ to connect to. In an embodiment, the default public port 416 provides a default connection to the default public network 406 and to the remote device 402 connected to the default public network 406. In other words, default public port 420 is a port that, by default, is used to establish a network connection to the remote device 402. In one embodiment, NAT service 418 determines the default remote device 402 and/or default public network 406 using a heuristic algorithm and stores the default remote device 402 and/or public network 406 in database 420.

Further, database 420 stores network information for VMs $235_1$-$235_N$ of private network 404. The network information includes a private network address and a public network address for each VM $235_1$-$235_N$ of private network 404 that is connected to routing application 408. The private network address includes a MAC address, an IP address, and/or a port number that are hidden from remote devices 402. The public network address includes a MAC address, an IP address, and/or a port number that are provided to remote devices 402. Alternatively or additionally, the private network address and the public network address may include any other information that enables NAT service 418 to function as described herein.

In an embodiment, VMs $235_1$-$235_N$ on private network 404 may query network configuration settings of the default public network 406, such as proxy settings, from NAT service 418. The network configuration settings received from NAT service 418 may be stored within each VM $235_1$-$235_N$. The settings are retained and used for establishing network connections until the network configuration settings of communication interface 255 are released or reset.

During operation, a VM $235_1$ within private network 404 may have an application executing therein that is configured to transmit data to a remote device 402 within a public network 406. The application opens one or more network connections to remote device 402 through communication interface 255. Such network connections may include, but are not limited to only including, a transmission control protocol (TCP) connection, a user datagram protocol (UDP) connection, and/or any other suitable network connection. The application transmits one or more private outbound packets to remote device 402. The private outbound packets include a header that identifies the network address of the remote device 402 and the private network address of the VM $235_1$. Routing application 408 receives the private outbound packets through private link 410 and transmits the packets to NAT service 418. NAT service 418 references database 420 to correlate the private network address to the public network address, and replaces the private network address in each packet header with the public network address of VM $235_1$ to form one or more public outbound packets. Routing application 408 transmits the public outbound packets to remote device 402 through public port 416, public link 412, and public network 406.

Remote device 402 receives the public outbound packets and may transmit one or more data packets (hereinafter referred to as "public inbound packets") to VM $235_1$. As remote device 402 is provided with the public network address of VM $235_1$, the public inbound packets include the public network address in the header of each packet. Routing application 408 receives the public inbound packets and transmits the packets to NAT service 418. NAT service 418 references database 420 to correlate the public network address to the private network address, and replaces the public network address in the packet headers with the private network address of VM $235_1$ to form one or more private inbound packets. Routing application 408 transmits the private inbound packets to the destination VM $235_1$ through private link 410.

If a network component, such as public link 412, public network 406, public port 416, and/or remote device 402, becomes inaccessible, communication between VM $235_1$ and remote device 402 may be interrupted. In such a situation, NAT service 418 determines that the network connectivity with remote device 402 is unavailable. In an embodiment, NAT service 418 determines the network connectivity or availability of the network components, such as remote device 402, by monitoring the network connectivity or status of the public port 416 that the network component is connected to. For example, if public port 416 is unavailable to communicate with remote device 402 (i.e., if public port 416 indicates that public link 412 or public network 406 connected to public port 416 is unavailable for network communication with remote device 402), NAT service 418 determines that the associated remote device 402 is also unavailable or down. In an embodiment, NAT service 418 receives an event or a signal indicating that the network connection to remote device 402 is unavailable. In addition, NAT service 418 may receive an event or signal indicating that a network configuration setting of public port 416 has changed that renders remote device 402 unreachable or unavailable, such as a change of the network address or proxy settings of public port 416 used to connect to remote device 402. A change to the default public port 416 (i.e., a change to the default connection to the default public network 406) listed in database 420, and/or any other network configuration change may also indicate that remote device 402 or public network 406 is unreachable or unavailable.

If NAT service 418 determines that remote device 402 is unavailable (i.e., that public port 416 is unavailable to communicate with remote device 402), that the default public network 406 has changed, and/or that the network configuration setting of public port 416 has changed, NAT service 418 updates database 420 to indicate the unavailable network status of remote device 402, the network availability status of public port 416, and/or the network configuration settings of public port 416 associated with remote device 402. NAT service 418 also updates the default public network 406 in database 420. Further, NAT service 418 notifies each VM $235_1$-$235_N$ within private network 404 that remote device 402 or public network 406 is unavailable and/or that the network configuration setting associated with remote device 402 or public network 406 has changed and/or that the default public network 406 (or the associated default public port 416) has changed. Specifically, NAT service 418 notifies VMs $235_1$-$235_N$ by transmitting or broadcasting a message (hereinafter referred to as a "link interruption message") throughout private network 404 indicating that the network connection between VM $235_1$ and remote device 402 has been interrupted. The link interruption message directs each VM $235_1$-$235_N$ in private network 404 to release or reset network connections at a link layer of a network protocol stack executing on each VM $235_1$-$235_N$. In one embodiment, NAT service 418 simulates a removal of power from private ports 414 by broadcasting the link interruption message to each VM $235_1$-$235_N$ in private network 404. When each VM $235_1$-$235_N$ receives the link interruption message, e.g., through a respective communication interface 255, the network configuration settings of communication interface 255 are released or reset to uninitialized values. Alternatively, the link interruption message may be any other signal or message that enables communication interface 255 to be released. In one embodiment, NAT service 418 notifies each VM $235_1$-$235_N$ that public network 406 is unavailable and/or that the network configuration setting associated with remote device 402 has changed (e.g., by transmitting a link interruption message), regardless of whether VMs $235_1$-$235_N$ have any open network connections to the unavailable remote device 402 or to any other remote devices 402.

NAT service 418 waits a predetermined amount of time and notifies each VM $235_1$-$235_N$ within private network 404 that network connections may be reinitialized, e.g., by simulating a restoration of power to private ports 414. Specifically, NAT service 418 broadcasts a message indicative of a restoration of connectivity and/or power (hereinafter referred to as a "link restoration message") of each private link 410 and/or private port 414. The predetermined amount of time may be about 5 seconds, or may be any other amount of time that enables NAT service 418 to function as described herein. When communication interfaces 255 detect that power has been restored to private ports 414 (i.e., by receiving the link restoration message), VMs $235_1$-$235_N$ and/or communication interfaces 255 reinitialize or reconfigure their network configuration settings, including IP address and proxy settings. The reinitialization of reconfiguration of the network settings may include, for example, flushing a DNS cache within VMs $235_1$-$235_N$. In addition, VMs $235_1$-$235_N$ and/or communication interfaces 255 reconfigure network connections to routing application 408 and to one or more remote devices 402. VMs $235_1$-$235_N$ also query remote devices 402, through NAT service 418, to determine the network configuration settings (e.g., the IP address) of remote devices 402 or proxy settings for public network 406. The configuration settings may be used to establish future network connections. Additionally, VMs $235_1$-$235_N$ may query NAT service 418 to determine the default remote device 402 and/or public network 406 to connect to. Alternatively, NAT service 418 may use any suitable notification or message that enables NAT service 418 to direct VMs $235_1$-$235_N$ and/or communication interfaces 255 to reinitialize the network connection to routing application 408 and remote device 402.

One or more applications executing on VMs $235_1$-$235_N$ may have open network connections to remote device 402 after private links 410 and/or private ports 414 have been reset and communication interface 255 has been reinitialized. Accordingly, in response to the determination that a remote device 402 associated with an open network connection listed in database 420 is unavailable (i.e., that public port 416 is unavailable to communicate with remote device 402) and/or that a network configuration setting of public port 416 has changed, NAT service 418 transmits a message (hereinafter referred to as a "connection reset message") to each application at a protocol layer directing each application executing on each VM $235_1$-$235_N$ and having an open network connection with remote device 402 to reinitialize the network connection. Specifically, NAT service 418 references database 420 to identify each open network connection to the unavailable remote device 402. NAT service 418 transmits the connection reset message to each VM $235_1$-$235_N$ associated with the identified open network connections (and thereby to each application executing on VMs $235_1$-$235_N$). In an embodiment, the connection reset message is a virtual or simulated TCP reset message or packet (i.e., a TCP-based packet with a reset flag or bit set) that causes the applications executing on VMs $235_1$-$235_N$ to reset their network connections to remote device 402. Alternatively, the connection reset message may be any suitable message or packet that enables NAT service 418 to direct the applications to reset their network connections to remote device 402.

After resetting the network connections of the applications, each application reinitializes and/or reconfigures the network connections to remote device 402. Such a reconfiguration of the network connections to remote device 402 may result in VMs $235_1$-$235_N$ connecting to remote device 402 through a different network path or public port 416 to avoid a faulty public link 412 and/or a faulty public network 406. If remote device 402 remains unavailable, the applications (and VMs $235_1$-$235_N$) negotiate network connections to another remote device 402. Accordingly, the applications executing on VMs $235_1$-$235_N$ may circumvent the unavailable remote device 402 and negotiate an alternative path or resource for obtaining desired data.

FIG. 5 is a flowchart of an exemplary method 500 for translating network addresses between a private network, such as private network 304 (shown in FIG. 3) or private network 404 (shown in FIG. 4) and a public network, such as public network 306 (shown in FIG. 3) or public network 406 (shown in FIG. 4). Method 500 is at least partially executed by a computing device 100 (shown in FIG. 1) and/or a VM $235_1$ (shown in FIG. 2). For example, a plurality of computer-executable instructions are embodied within a computer-readable medium, such as memory 104 or memory 250. The instructions, when executed by a processor, such as processor 102 or processor 245, cause the processor to execute the steps of method 500 and/or to function as described herein. Method 500 enables at least one private network device, such as computing device 100 or VM $235_1$, to establish a network connection with at least one remote device, such as remote device 302 (shown in FIG. 3) or remote device 402 (shown in FIG. 4). While method 500 may be executed using any combination of physical devices (e.g., computing devices 100 and routing device 308) and virtual devices (e.g., VMs $235_1$-$235_N$ and routing application 408) in a similar manner as described above with reference to FIG. 3 and FIG. 4, method 500 will be described with reference to virtual devices for clarity.

Method 500 includes executing 502 a network address translation (NAT) service 418 (shown in FIG. 4) by a processor, such as processor 245. NAT service 418 receives 504 a network connection from at least one private network device, such as VM $235_1$, to NAT service 418 by at least one private data link, such as private link 410. VM $235_1$ is positioned within a private network, such as private network 404. NAT service 418 also receives 506 a network connection from at least one remote device, such as remote device 402, to NAT service 418 by at least one public data link, such as public link 412. Further, remote device 402 is positioned within a public network, such as public network 406. As used herein, the terms "receive" and "receiving" a network connection are not limited to only establishing a new network connection between devices, but also include maintaining an existing network connection between devices.

NAT service 418 determines 508 a network availability of remote device 402. In an embodiment, NAT service 418 determines 508 the network availability of remote device 402 by monitoring a network connectivity or status of the public port 416 that remote device 402 is connected to through public link 412. In one embodiment, NAT service 418 receives an event or a signal indicating that the network connection to public port 416 and/or remote device 402 is unavailable. In addition, NAT service 418 may receive an event or signal indicating that a network configuration setting has changed that renders remote device 402 unreachable or unavailable, such as a change of the network address of remote device 402, a change to the default remote device 402 listed in database 420 (shown in FIG. 4), and/or any other network configuration change.

If NAT service 418 determines 510 that remote device 402 is unavailable (e.g., based on the network availability and/or network configuration settings of public port 416 and/or remote device 402), NAT service 418 notifies each private network device that remote device 402 is unavailable, for example, by indicating that the network connection to remote device 402 has been interrupted and/or that a network configuration setting, such as an IP address of remote device 402, has changed. If NAT service 418 determines that the default public network 406 and/or the default public port 416 has changed, service 418 notifies each private network device that the default public network 406 has changed. In an embodiment, NAT service 418 notifies each private network device by transmitting 512, or broadcasting, a link interruption message to each private network device within private network 404 (i.e., to each VM $235_1$-$235_N$ within private network 404). The link interruption message causes each VM $235_1$-$235_N$ within private network 404 to release or reset the network configuration settings of communication interface 255. It should be understood that in an embodiment in which the private network devices are computing devices 100 coupled to NAT service 322 of routing device 308, NAT service 322 notifies each private network device that a remote device 302 or public network 306 is unavailable and/or that the network configuration setting has changed by removing power to each private port 318.

In addition, if NAT service 418 determines 510 that remote device 402 is unavailable and/or that the network configuration setting has changed, NAT service 418 transmits 514 a connection reset message to at least one VM $235_1$-$235_N$. Specifically, NAT service 418 (i.e., processor 245) receives, from database 420, a list of open network connections to remote device 402. Each open network connection is associated with a corresponding VM $235_1$-$235_N$. NAT service 418 transmits 514 the connection reset message to each VM $235_1$-$235_N$ that has a corresponding open network connection to remote device 402 listed in database 420. The connection reset message causes the applications executing on VMs $235_1$-$235_N$ to terminate the connection to remote device 402.

NAT service 418 waits 516 a predetermined amount of time after transmitting 512 the link interruption message. The predetermined amount of time may be about 5 seconds, or any other amount of time. After the predetermined amount of time has elapsed, NAT service 418 transmits 518 a link restoration message to private network 404 (i.e., to each VM $235_1$-$235_N$ within private network 404).

When VMs $235_1$-$235_N$ receive the link restoration message, VMs $235_1$-$235_N$ and/or communication interfaces 255 reinitialize or reconfigure network settings, including IP address and proxy settings, and/or connections to routing application 408 and to one or more remote devices 402. In addition, after resetting the network connections of the applications through the connection reset messages, each application reinitializes and/or reconfigures the network connections to remote device 402. If remote device 402 remains unavailable, the applications (and VMs $235_1$-$235_N$) negotiate network connections to another remote device 402. Accordingly, the applications executing on VMs $235_1$-$235_N$ may circumvent the unavailable remote device 402 and negotiate an alternative path or resource for obtaining desired data.

Exemplary Operating Environment

The network address translation (NAT) service as described herein may be performed by a computer or computing device. A computer or computing device may include one or more processors or processing units, system memory, and some form of computer-readable media. Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media store information such as computer-readable instructions, data structures, program modules, or other data. Communication media typically embody computer-readable instructions, data structures, program modules, or other data in a modulated data signal such as a carrier wave or other transport mechanism and include any information delivery media. Combinations of any of the above are also included within the scope of computer-readable media.

Although described in connection with an exemplary computing system environment, embodiments of the disclosure are operative with numerous other general purpose or special purpose computing system environments or configurations. Examples of well known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

The operations illustrated and described herein may be implemented as software instructions encoded on a computer-readable medium, in hardware programmed or designed to perform the operations, or both. For example, aspects of the disclosure may be implemented as a system on a chip.

The embodiments illustrated and described herein as well as embodiments not specifically described herein but within the scope of aspects of the disclosure constitute exemplary means for maintaining high availability of software application instances, such as virtual machines.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for connecting to at least one remote device, the system comprising:
   at least one virtual machine (VM) positioned within a private network; and
   a routing application comprising:
      at least one private port, wherein the VM is communicatively coupled to the private port;
      at least one public port; and
      a network address translation (NAT) service; and
      a NAT database including a list of open network connections to the at least one remote device, wherein the at least one VM is associated with at least one open network connection of the list of open network connections; and
      wherein the NAT service instructs a processor to:
         determine a network availability of a remote device communicatively coupled to the public port by monitoring a status of the public port;
         transmit a link interruption message to the VM upon a determination of one or more of the following: (A) a network configuration setting of the public port has changed, (B) the public port is unavailable to communicate with the remote device, and (C) a default public port associated with the remote device has changed; and
         transmit a transmission control protocol (TCP) connection reset message to each VM associated with the at least one open network connection upon the determination of one or more of the following: (A) a network configuration setting of the public port has changed and (B) the public port is unavailable to communicate with the remote device.

2. The system of claim 1, wherein the at least one VM includes a plurality of VMs, and wherein the NAT service instructs the processor to broadcast the link interruption message to each VM of the plurality of VMs within the private network upon the determination of one or more of the following: (A) a network configuration setting of the public port has changed, (B) the public port is unavailable to communicate with the remote device, and (C) the default public port has changed.

3. The system of claim 1, wherein the VM includes a plurality of network configuration settings for use in connecting to the remote device, the VM receives the link interruption message and releases the network configuration settings in response to the link interruption message.

4. The system of claim 3, wherein the NAT service further instructs the processor to transmit a link restoration message to the VM after transmitting the link interruption message to the VM.

5. The system of claim 4, wherein the VM receives the link restoration message and initializes the network configuration settings in response to the link restoration message.

6. The system of claim 4, wherein the NAT service waits a predetermined amount of time after instructing the processor to transmit the link interruption message before instructing the processor to transmit the link restoration message.

7. A method comprising:
executing, by a processor, a network address translation (NAT) service;
receiving a network connection from at least one private network device to the NAT service by at least one private data link, wherein the private network device is positioned within a private network;
receiving a network connection from at least one remote device to the NAT service by at least one public data link, wherein the at least one remote device is positioned within a public network;
determining, by the processor, a network availability of the at least one remote device;
notifying the private network device upon a determination of one or more of the following: (A) a network configuration setting associated with the at least one remote device has changed, (B) the at least one remote device is unavailable, and (C) a default connection to the at least one remote device has changed;
receiving a list of open network connections to the at least one remote device, wherein the private network device is associated with at least one open network connection of the list of open network connections; and
transmitting a transmission control protocol (TCP) connection reset message to each private network device associated with the at least one open network connection upon the determination of one or more of the following: (A) a network configuration setting associated with the at least one remote device has changed and (B) the at least one remote device is unavailable.

8. The method of claim 7, wherein the private network device is coupled to the NAT service by a private port, and wherein notifying the private network device comprises removing power to the private port.

9. The method of claim 7, wherein the at least one private network device includes a plurality of private network devices, and wherein notifying the private network device comprises broadcasting a link interruption message to each private network device of the plurality of private network devices within the private network.

10. The method of claim 9, further comprising transmitting a link restoration message to each private network device after the link interruption message has been transmitted to each private network device.

11. The method of claim 10, further comprising receiving, by the private network device, the link restoration message and initializing, by the private network device, the network configuration settings in response to the link restoration message.

12. The method of claim 11, further comprising waiting a predetermined amount of time after transmitting the link interruption message before transmitting the link restoration message.

13. The method of claim 7, wherein the at least one remote device is coupled to the NAT service by a public port, and wherein determining, by the processor, a network availability of the at least one remote device comprises monitoring a status of the public port to determine one or more of the following: (A) a network configuration setting of the public port has changed and (B) the public port is unavailable to communicate with the at least one remote device.

14. The method of claim 13, wherein a plurality of public ports are coupled to the NAT service, and wherein the method further comprises storing one or more of the following: (A) a network configuration setting and (B) a network connectivity status of each public port within a database.

15. One or more non transitory computer storage media having computer-executable instructions embodied thereon, wherein, when executed by at least one processor, the computer-executable instructions cause the processor to:
execute a routing application including a network address translation (NAT) service;
establish a database including network information for at least one virtual machine (VM) positioned within a private network and coupled to the routing application by at least one private data link, wherein the network information includes a private network address for the VM and a public network address for the VM;
determine a network availability of at least one remote device coupled to the routing application by at least one public data link, wherein the at least one remote device is positioned within a public network;
transmit a link interruption message to the VM upon a determination that at least one of (A) a network configuration setting associated with the at least one remote device has changed, (B) the at least one remote device is unavailable, and (C) a default connection to the at least one remote device has changed;
receive a list of open network connections to the at least one remote device, wherein the VM is associated with at least one open network connection of the list of open network connections; and
transmit a transmission control protocol (TCP) connection reset message to each VM associated with the at least one open network connection upon the determination of one or more of the following: (A) a network configuration setting associated with the at least one remote device has changed and (B) the at least one remote device is unavailable.

16. The non transitory computer storage media of claim 15, wherein the at least one VM includes a plurality of VMs, the computer-executable instructions further cause the processor to broadcast the link interruption message to each VM of the plurality of VMs within the private network upon the determination of one or more of the following: (A) a network configuration setting associated with the at least one remote device has changed, (B) the at least one remote device is unavailable, and (C) the default connection to the at least one remote device has changed.

17. The non transitory computer storage media of claim 15, wherein the computer-executable instructions further cause the processor to transmit a link restoration message to the VM after the link interruption message has been transmitted to the VM.

18. The non transitory computer storage media of claim 17, wherein the computer-executable instructions further cause the processor to wait a predetermined amount of time after transmitting the link interruption message before transmitting the link restoration message.

19. The non transitory computer storage media of claim 15, wherein the at least one remote device is coupled to the NAT service by a public port that is a default public port for establishing the default connection to the at least one remote device, and wherein the computer-executable instructions further cause the processor to determine the network availability of the at least one remote device by monitoring a status of the public port to determine of one or more of the following: (A) a network configuration setting of the public port has changed, (B) the public port is unavailable to communicate with the at least one remote device, and (C) the default public port has changed.

20. The non transitory computer storage media of claim 19, wherein a plurality of public ports are coupled to the NAT service, and wherein the computer-executable instructions further cause the processor to include one or more of the following: (A) a network configuration setting of each public port, (B) a network connectivity status of each public port, and (C) the default public port within the database.

21. A network routing device comprising:
  a memory configured to store a network address translation (NAT) database that includes a list of open network connections to at least one remote device, wherein the at least one computing device is associated with at least one open network connection of the list of open network connections;
  at least one private port for receiving a network connection from the at least one computing device, the at least one computing device being within a private network;
  at least one public port for receiving a network connection from the at least one remote device, the at least one remote device being within a public network; and
  a processor coupled to the memory and programmed to execute a NAT service, wherein the NAT service:
    determines a network availability of the at least one remote device;
    removes power from the private port upon a determination of one or more of the following: (A) a network configuration setting of the public port has changed, (B) the public port is unavailable to communicate with the at least one remote device, and (C) a default public port associated with the at least one remote device has changed; and
    transmits a transmission control protocol (TCP) connection reset message to each computing device associated with the at least one open network connection upon the determination of one or more of the following: (A) a network configuration setting of the public port has changed and (B) the public port is unavailable to communicate with the at least one remote device.

22. The network routing device of claim 21, wherein the at least one computing device comprises a plurality of computing devices and the at least one private port comprises a plurality of private ports for receiving a network connection from a respective computing device of the plurality of computing devices, and wherein the NAT service removes power from each private port upon the determination of one or more of the following: (A) a network configuration setting of the public port has changed, (B) the public port is unavailable to communicate with the at least one remote device, and (C) the default public port has changed.

23. The network routing device of claim 21, wherein the NAT service restores power to the private port after removing power to the private port.

24. The network routing device of claim 23, wherein the NAT service waits a predetermined amount of time after removing power from the private port before restoring power to the private port.

* * * * *